(12) United States Patent
Asa

(10) Patent No.: US 6,440,000 B1
(45) Date of Patent: Aug. 27, 2002

(54) UNIVERSAL JOINT

(75) Inventor: Yukihiro Asa, Tokyo (JP)

(73) Assignee: Asa Electronic Industry Co., Ltd., Tokyo (JP)

( * ) Notice: Subject to any disclaimer, the term of this patent is extended or adjusted under 35 U.S.C. 154(b) by 2 days.

(21) Appl. No.: 09/634,418

(22) Filed: Aug. 8, 2000

(30) Foreign Application Priority Data

Dec. 6, 1999 (JP) .......................................... 11-346155

(51) Int. Cl.$^7$ ................................................. F16D 3/78
(52) U.S. Cl. ............................ 464/98; 464/147; 464/99
(58) Field of Search ............................. 464/95, 93, 94, 464/96, 99, 98, 106, 137, 138, 902, 147

(56) References Cited

U.S. PATENT DOCUMENTS

| | | | | |
|---|---|---|---|---|
| 1,682,721 A | * | 8/1928 | Bijur ............................ | 464/95 |
| 2,182,711 A | * | 12/1939 | Thomas ......................... | 464/99 |
| 2,430,449 A | * | 11/1947 | Brown .......................... | 464/99 |
| 2,435,058 A | * | 1/1948 | Thomas ......................... | 464/99 |
| 2,846,857 A | * | 8/1958 | Hagenlocher ................. | 464/95 |
| 3,229,480 A | * | 1/1966 | Seigel et al. .................. | 464/99 |
| 3,266,270 A | * | 8/1966 | Yutkowitz ..................... | 464/95 |
| 4,613,316 A | * | 9/1986 | Reynolds ...................... | 464/85 |
| 5,176,575 A | * | 1/1993 | McCullough ................. | 464/99 |
| 5,221,232 A | * | 6/1993 | Nameny ........................ | 464/98 |
| 5,465,804 A | * | 11/1995 | Malik ............................ | 464/99 |
| 6,145,419 A | * | 11/2000 | Laycock ....................... | 464/95 |

FOREIGN PATENT DOCUMENTS

JP  7-52428  11/1995

* cited by examiner

*Primary Examiner*—Lynne H. Browne
*Assistant Examiner*—Kenn Thompson
(74) *Attorney, Agent, or Firm*—Flynn, Thiel, Boutell & Tanis, P.C.

(57) ABSTRACT

In order to provide a universal joint suitable as a small diameter joint capable of transmitting a large torque and having a high rotational precision and a high durability at a low cost, the universal joint is a kind of spring ring joints coupling a driven shaft with a driving shaft, for which an angle formed by their axis lines is not great, constructed so as to deal with deviations of the axis lines with respect to each other, owing to the fact that thin bending plates made of glass fiber reinforced polyimide bend. Linking boss portions supporting the bending plates and an intermediate disk are made of a high duty aluminium alloy for elongation having a high tenacity by die cast. A part of the linking boss portions and the intermediate disk is formed as protruding arbors for caulking and the bending plates are jointed directly therewith by caulking.

3 Claims, 5 Drawing Sheets

UNIVERSAL JOINT

FIELD OF THE INVENTION

The present invention relates to a joint having a small diameter and in particular to a universal joint having a high durability, which couples two dynamic force transmitting shafts deviated slightly in an angular direction from each other.

DESCRIPTION OF THE PRIOR ART

FIGS. 7(a) and 7(b) show a bending joint 700 made of a light alloy by mechanical processing in one body, having a small diameter and suitable for dynamic force transmission; FIG. 7(a) being a side view shown in a direction perpendicular to an axis line, FIG. 7(b) being a side view shown parallelly to the axis line. A first slit 702 is formed, which traverses an axis line S in a cylinder cutting direction perpendicular to the axis line S, starting from a cylindrical surface 701, leaving a part exterior to a chord C forming a center angle of about 90° C. Then a second slit 703 is formed similarly and parallelly to the first slit 702 in a reverse direction at a position separated from the first slit 702 by a small distance d along the axis line S, the slits forming a pair.

Further a third and a fourth slit 704 and 705 forming another pair are formed in an orthogonal direction with respect to the pair formed by the first and the second slit 702 and 703 at a position separated from the second slit 703 by the same distance d similarly to the pair formed by the first and the second slit 702 and 703. Still further a pattern of the first slit 702 to the fourth slit 705 is repeated with the same separation distance d from the fourth slit 705. By forming such slits 702 to 705 in series, even if a mounting axis line Se of a driven shaft 712 is deviated with respect to a driving shaft 710, deviation can be absorbed by variations of widths δof the slits 702 to 705 and it is possible to deal therewith flexibly for transmitting rotation between the different axis lines.

Such a bending joint 700 is less flexible than a bending joint, in which a slit is formed in spiral and it has a smaller region of angular deviation between axis lines to be connected. However, since it can deal therewith for either rotational direction, forward or reverse, it has a high mechanical strength, and rotation transmission precision increases with increasing dynamic force transmitting torque, it is excellent in safety, reliability and durability.

However formation of the first slit 702 to the fourth slit 705 includes a number of fabrication steps and it is difficult to expect so as to have a high processing precision. Even if the processing is automated, since one cannot help relying on mechanical cutting processing, equipment investigation and production cost cannot be reduced. Further, since it is formed in one body, it is poor in adaptability, in case where dynamic force transmitting shafts having different diameters should be coupled. Further, since the different slits 702 to 705 traverse the axis line S of the bending joint 700, transmitted torque is absorbed by center displacement due to twisting deformation of linking parts 706 and according to measurements a relationship between rotation angle and torque cannot be represented not by a smooth curve but by a waveform. This is a problem, to which attention should be paid, particularly when it is applied to a mechanism such as an encoder, etc., to which precise angle transmission is necessary.

Moreover a universal joint disclosed in Japanese Utility Model Publication No. Hei 7-52428(B) solves the problem and contributes to not expensive supply thereof, because mass-production is possible therefor. However external shape thereof is somewhat complicated and one cannot help relying on manual work for linkage of two members by means of screws at mounting. Moreover, since throughholes required for making; screws pass through are formed in the neighborhood of a hole for the dynamic force transmitting shafts, thickness of parts linked by means of screws, to which load to be transmitted is applied, is reduced, which causes decrease in mechanical strength, and durability decreases due to variations in stress during rotation given repeatedly to the throughholes. Since a certain thickness remaining after formation of the throughholes is necessary, down-sizing for the purpose of space saving is limited even at the sacrifice of mechanical strength and it is unsuitable for a universal joint having an outer diameter smaller than 20 mm.

SUMMARY OF THE INVENTION

An object of the invention is to provide a universal joint at a low cost, which can deal with a great torque to be transmitted not at the sacrifice of strength and suitable for a coupling having a small diameter producing no errors of rotational angle transmission and having a high precision as well as a high durability.

In order to achieve the above object a universal joint according to the present invention having a bending coupling structure comprises a pair of thin bending plates, each of which has a basic shape of a ring; a pair of linking boss portions, each of which supports deformably one of the thin bending plates at two points in the neighborhood of two extremities of a diameter on a one-side surface thereof; and an intermediate disk supporting the thin bending plates similarly at two points on each surface in the neighborhood of two extremities of a straight line orthogonal to the diameter.

The linking boss portions and the intermediate disk are made of a high duty aluminium alloy for elongation having a high tenacity or other equivalent materials by die cast and a round plain arbor for caulking protruding from the center of each of supports holding the thin bending plates, which secures directly one of the bending plates, is formed in one body therewith.

The high duty aluminium alloy is an Al-Mg-Cr alloy (hydronarium or hydro) and each of the bending plates is a thin plate, whose thickness is smaller than 0.6 mm, made of glass fiber reinforced polyimide or another equivalent synthetic resin. Further the bending plate may be a thin plate made of carbon fiber reinforced epoxy resin or another equivalent resin, whose thickness is smaller than 0.8 mm.

Moreover it is preferable to form the bending plate by superposing a stainless steel thin plate having a same shape, whose thickness is smaller than 0.4 mm, on the synthetic resin thin plate. In addition, the round plain protruding arbor for caulking may be constructed in one body by insert formation using another suitable member at the die cast formation of each of the linking boss portions and the intermediate disk.

DESCRIPTION OF THE PREFERRED EMBODIMENTS

Figure 1:
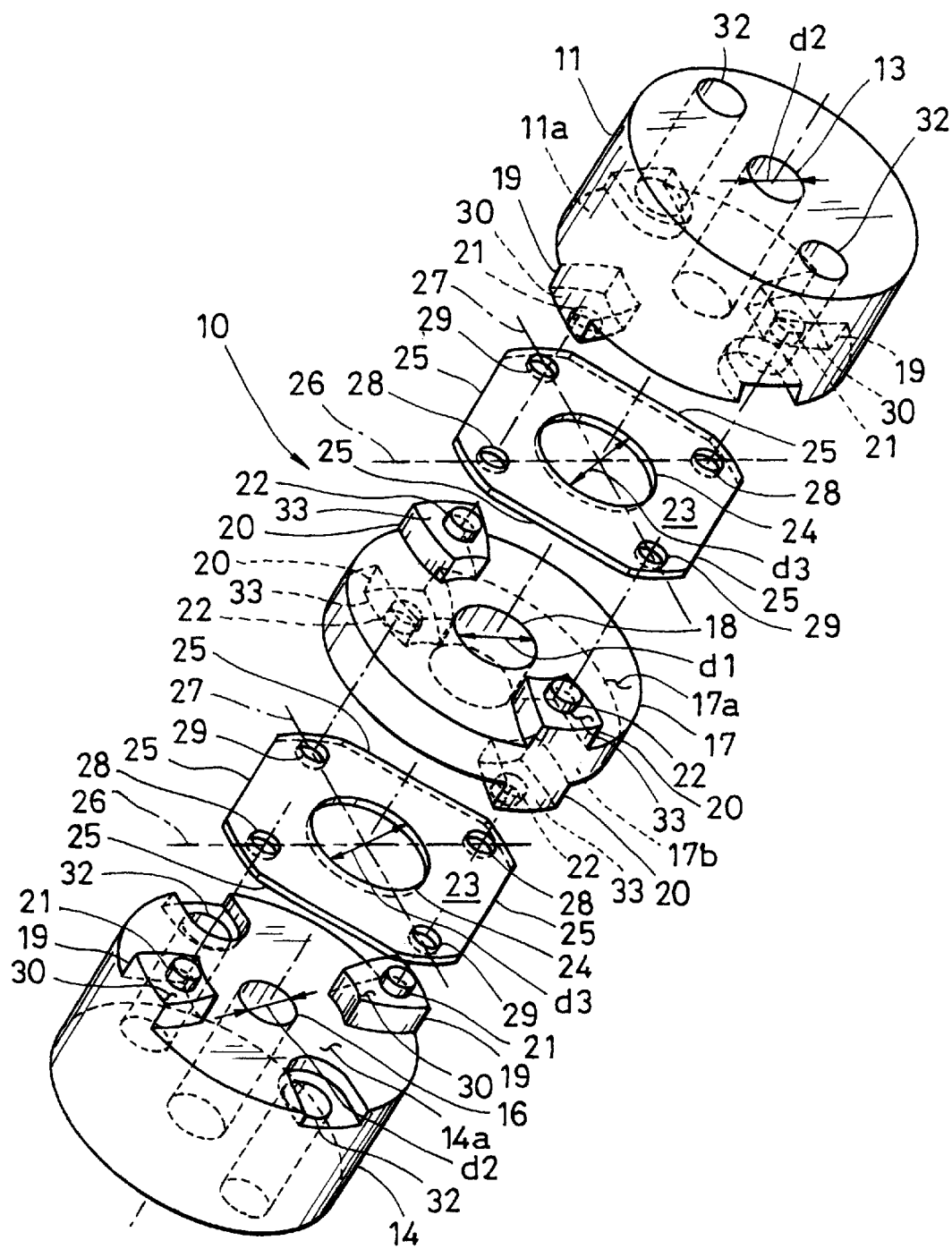
FIG. 1 is an exploded perspective view showing an embodiment of the universal joint according to the present invention.
Figure 2A:
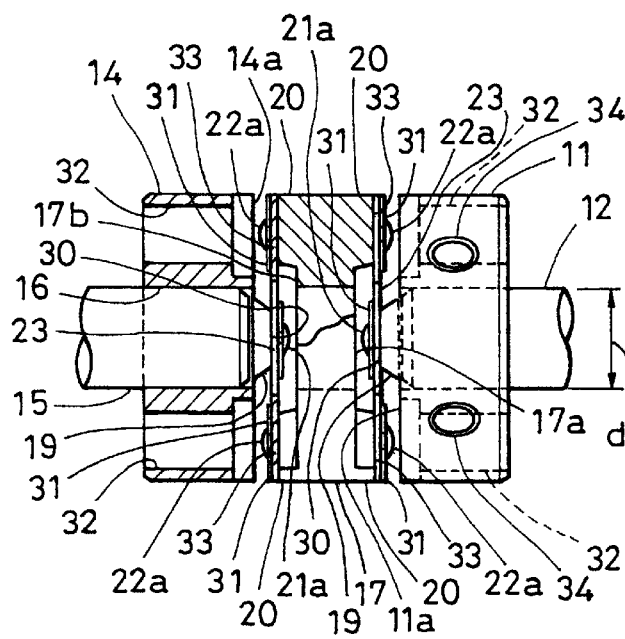
FIG. 2(a) is a side view of a mounted universal joint in the embodiment indicated in FIG. 1, viewed in a direction perpendicular to an axis line, indicated partly in cross section.
Figure 2B:
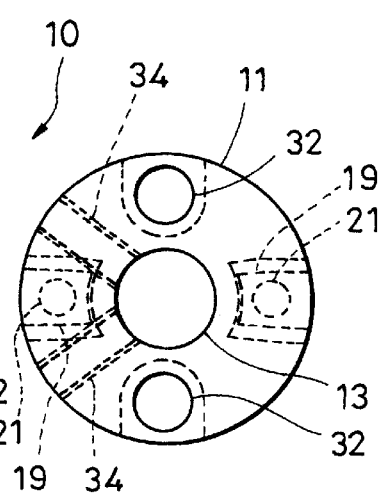
FIG. 2(b) is a side view of the mounted universal joint, viewed along the axis line.

Hereinbelow several embodiments of the universal joint according to the present invention will be explained, referring to the drawings, in which FIG. 1 is an exploded perspective view showing an embodiment of the universal joint 10 according to the present invention; FIG. 2(a) is a side view of a mounted universal joint, viewed in a direction perpendicular to an axis line, indicated partly in cross section; and FIG. 2(b) is a side view thereof, viewed along the axis line. For convenience's sake the right side in the figures is a driving side, while the left side is a driven side.

In FIGS. 1, 2(a) and 2(b), reference numeral 11 is a linking boss portion, in which a hole 13, into which a driving shaft 12 is inserted, is formed, while 14 is a linking boss portion, in which a hole 16, into which a driven shaft 15 is inserted, is formed. It is fabricated always with a same shape and size except for the diameter of the shaft. 17 is a ring-shaped intermediate disk. A central throughhole 18 is formed therein so that the inner diameter d1 thereof is equal to or greater than the diameter d2 of the driven shaft 12 and the driving shaft 15.

The driving shaft linking boss portion 11, the driven shaft linking boss portion 14 and the intermediate disk 17 are made of a hydronarium die cast product (HD-3) (hydro or hydra), which is an Al-Mg-Cr high duty aluminium alloy, or another equivalent material. Supports 19, 20 are disposed protrudingly in the axial direction at the neighborhood of two extremities of straight lines on one surface 11a, 14a of each of the linking boss portions 11 and 14 and both surfaces 17a and 17b of the intermediate disk 17. Further round plain arbors for caulking 21 and 22 extend respectively from supporting surfaces 30 and 33 of the supports 19 and 20 by a predetermined length. 23 represents a bending plate having a basic shape of a ring. The inner diameter d3 of a central opening 24 is so determined that the remaining annular outer peripheral portion can flexibly deal with bending while maintaining a certain strength capable of transmitting a required torque and that it can bear repeated deformation. In the present embodiment, 4 chords, outside of which every 2 arch portions opposite to each other or both the sides of the central opening 24 are cut away, define a square. Caulking holes 28 and 29 are formed in the neighborhood of extremities of diameters 26 and 27 corresponding to the two diagonals of this square at positions corresponding to the protruding arbors for caulking 21 and 22, which are engaged respectively with the caulking holes 28 and 29.

The bending plate 23 is a polyimide thin plate, a glass fiber reinforced polyimide thin plate, a carbon fiber reinforced epoxy thin plate or another equivalent synthetic resin thin plate. A thickness of the plate is selected between 0.2 and 0.6 mm, depending on the torque to be transmitted or an environment, in which it is used, or a stainless steel thin plate having the same shape as the thin plate (not shown) is superposed thereon to be used in order to take measures to meet severe conditions.

Now mounting of the universal joint according to the present embodiment will be explained. The respective protruding arbors for caulking 21 of the driving shaft linking boss portion 11 and the driven shaft linking boss portion 14 are inserted into the corresponding caulking holes 28 with a washer 31 for each of them. Thereafter extremities of the protruding arbors for caulking 21 are deformed by press to form caulking heads 21a. Each of the bending plates 23 is secured to the supporting surface 30 of the supporter 19 by joining by press and at the linking boss portion 11, 14 it is supported deformably around the supporting surface 30 as a fulcrum owing to a space formed by a step between each of the one-side surfaces 11a, 14a and the supporting surface 30 of each of the supports 19.

Then the bending plates 23, which are supported by the driving shaft linking boss portion 11 and the driven shaft linking boss portion 14, respectively, are set opposite to each other and the intermediate disk 17 is put therebetween. That is, for each of the bending plates 23, the corresponding protruding arbors for caulking 22 on the intermediate disk 17 are inserted into the remaining holes 29 on the diameter 27 orthogonal to the diameter 26, on which the caulking holes 28 are fixed to the two linking boss portions 11 and 14, with washers 31 and thereafter extremities of the protruding arbors for caulking 22 are deformed by press to form caulking heads 22a.

Access holes 32, which are at positions in both the linking boss portions 11 and 14, corresponding to the caulking holes 29 in the bending plates 23, are extra holes used only for inserting a caulking tool (not indicated in the figures) for caulking work, but it has effects to lighten the universal joint 10 itself, independently from strength and to reduce rotational inertia. Each of the bending plates 23 is secured to the supporting surface 33 of the support 20 by joining by press. Each of the bending plates 23 is supported deformably around a surface contacting with the supporting surface 33 as a fulcrum owing to a space formed by a step between each of the surfaces 17a and 17b of the intermediate disk 17 and the supporting surface 33 of each of the supports 20.

As described above, it is possible to deal with deviation in the axis line between the driving shaft and the driven shaft owing to the fact that the two annular thin bending plates 23 supported deformably between the linking boss portions 11 and 14 opposite to each other on both the sides of the intermediate disk 17. Consequently, e.g. within a high precision apparatus, it is possible to transmit precisely movement with a same rotational speed (angle) from the driving shaft to the driven shaft, whose axis line is approximately in accordance with the axis line of the former. Further polyimide resin, of which the bending plates 23 are made, has a high heat resistance and it can endure satisfactorily a high temperature environment (about 400° C.), including self heat production due to repeated deformation during high speed rotation.

Figure 3A:
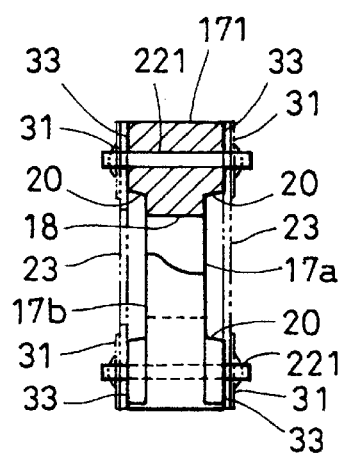
FIG. 3(a) is a side view of the intermediate disk in a second embodiment of the universal joint according to the present invention, indicated partly in cross-section.
Figure 3B:
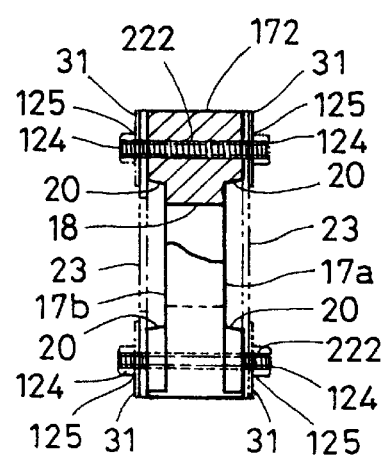
FIG. 3(b) is a side view of the universal joint having a linking member different from that indicated in FIG. 3(a)

In the embodiment described above, since a material having a high elongating property and a high tenacity, for which caulking processing is possible, is used for both the linking boss portions 11 and 14 as well as the intermediate disk 17, the protruding arbors for caulking 21 and 22 are formed by making the same material as both the linking boss portions 11 and 14 as well as the intermediate disk 17 extend therefrom. On the contrary, as indicated in FIGS. 3(a) and 3(b) in a second embodiment, separate members 221 and 222 may be buried by insert formation in intermediate disks 171 and 172 as linking members for the bending plate 23. In the embodiment described below, same reference numerals are used for the members corresponding to those indicated in the preceding embodiment.

Suitable rivet members 221 are buried by insert formation in the intermediate disk 171 indicated in FIG. 3(a) and used for caulking similarly to the preceding embodiment. In the intermediate disk 172 indicated in FIG. 3(b) headless bolts 222 are buried by insert formation. The bending plates 23 are fixed by means of nuts 124 and adhesive product 125 is used in order to prevent loosening thereof. In the second embodiment, although explanation has been made for the intermediate disk 17, linking members for the bending plates 23 may be buried by insert formation also in the linking boss portions 11 and 14.

Figure 4:
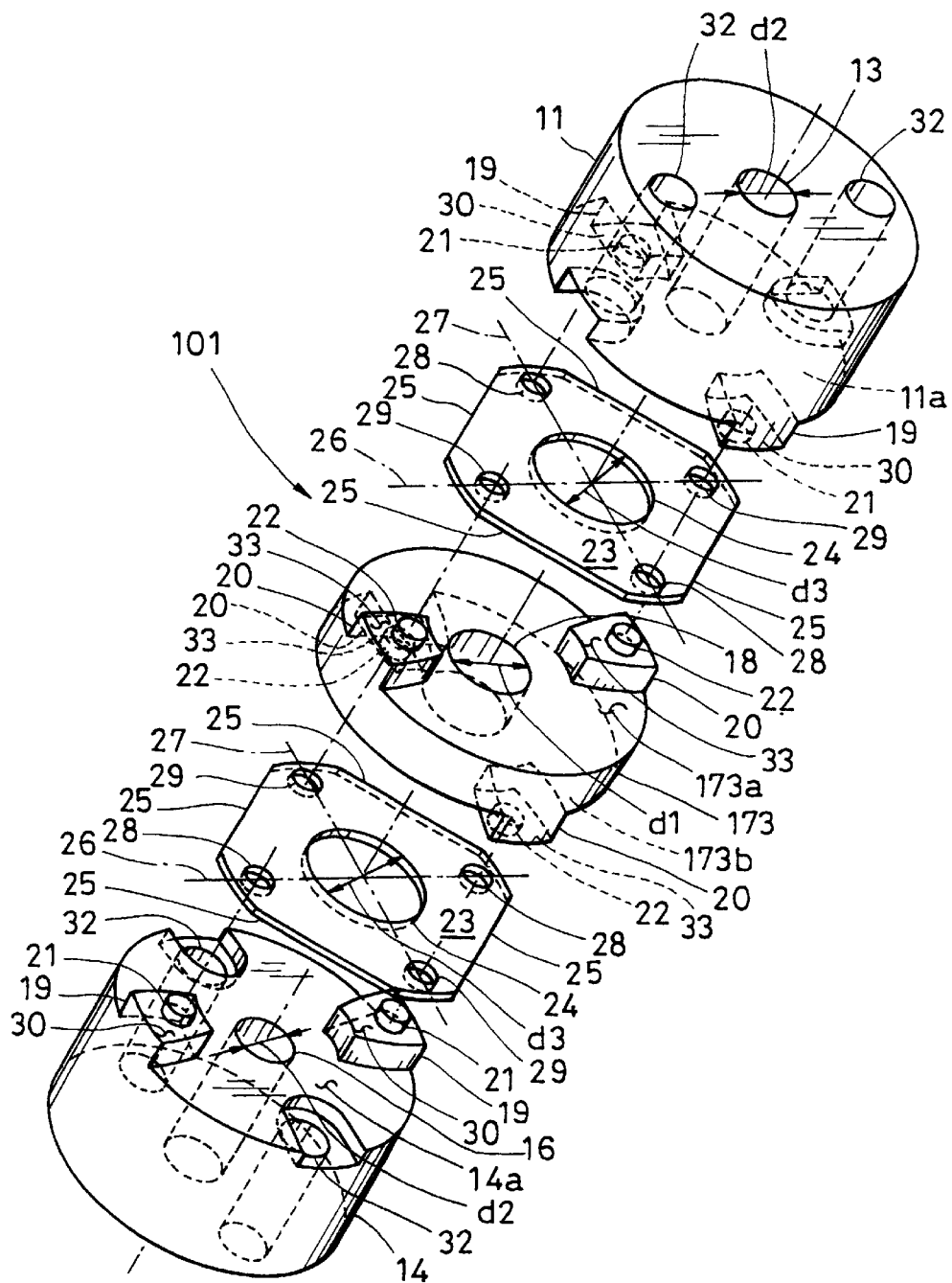
FIG. 4 is an exploded perspective view similar to FIG. 1 for explaining the intermediate disk in a third embodiment of the universal joint according to the present invention.

In the embodiment described above axis lines of the protruding arbors 22 extending from the intermediate disk 17 on both the sides are aligned one a same line. On the contrary, in a third embodiment, in an intermediate disk 13 of a universal joint 101 illustrated as an example in a perspective view in FIG. 4, round plain protruding arbors 22 for caulking are disposed on diameters orthogonal to each other together with supports 20 on linking surfaces 173a and 173b of the bending plates 23 so that the bending plates 23 are supported with a phase difference of 90° on both the sides.

Although the embodiment described above is so constructed that screw holes 34 are tapped and setscrews (not shown) are used as linking means between the linking boss portions 11, 14 and the driving shaft 12 as well as the driven shaft 15, in the universal joint 10 according to the present invention, linking means described below are possible by using a high tenacity material for forming both the linking boss portions 11 and 14. The linking means are common for the driving shaft 12 and the driven shaft 15 and linking boss portions 311 (fourth embodiment) and 411 (fifth embodiment) for a dynamic force transmitting shaft 120 will be explained together.

Figure 5A:
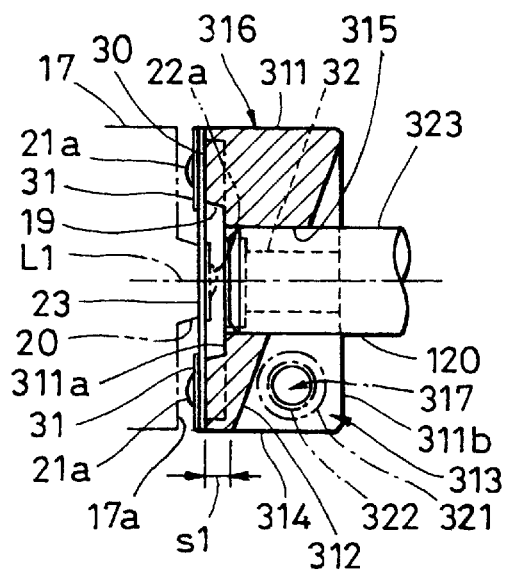
FIG. 5(a) is a cross-sectional view in a plane passing through the axis line, showing means for fixing a linking boss portion in a fourth embodiment of the universal joint according to the present invention.
Figure 5B:
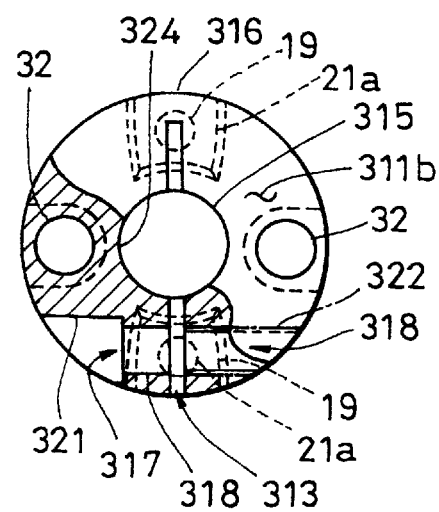
FIG. 5(b) is a side view thereof viewed in an axial direction.

FIG. 5(a) is a cross-sectional view of the linking boss portion 311 in the fourth embodiment viewed in a direction perpendicular to the axis line and FIG. 5(b) is a side view thereof viewed along the axis line, indicated partially in cross section. In the linking boss portion 311, a slit 313 debouches in a base plate 312 forming an angle with respect to the axis line L1 from a surface 311a of a peripheral wall 314 of the boss portion on the side, where the bending plate 23 is mounted, towards another surface 311b opposite thereto with a small distance S1, and traverses a shaft hole 315 along a diameter. The extremity of the base plate 312 arrives at the neighborhood of the peripheral wall 316 on the opposite side.

A bolt hole 317 is formed in the peripheral wall 314 of the boss portion on the side of the opening in a direction perpendicular to the surface of the slit 313. That is, a bolt throughhole 318 is formed in one of the wall surface portions opposite to each other of the slit 313, around which a hollow 321 is disposed for sinking a head of a bolt, while a female screw 322 is formed on the other thereof. A bolt not indicated in the figure is inserted into the bolt throughhole and fastened in a direction for reducing the width of the slit 313. In this way linkage of the linking boss portion 311 with the dynamic force transmitting shaft 120 is achieved by fixing a surface 323 of the dynamic force transmitting shaft engaged with the shaft hole 315 with a small play to the inner peripheral surface 324 thereof by press.

Figure 6A:
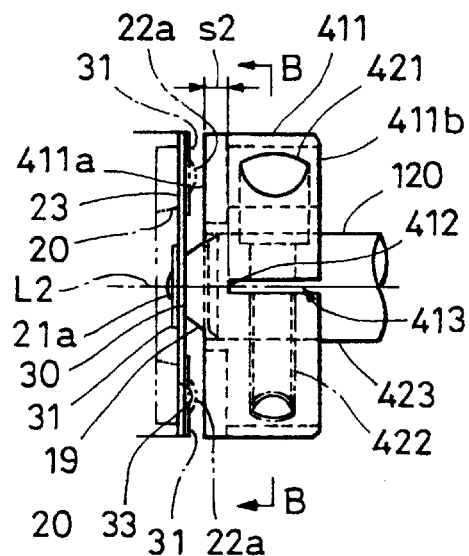
FIG. 6(a) is a side view showing means for fixing a linking boss portion in a fifth embodiment of the universal joint according to the present invention, viewed in a direction perpendicular to the axis line.
Figure 6B:
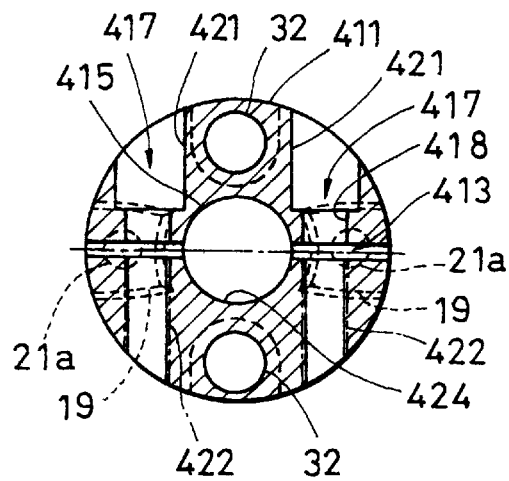
FIG. 6(b) is a cross-sectional view thereof, cut along a line B—B in FIG. 6(a)
Figures 7A, 7B:
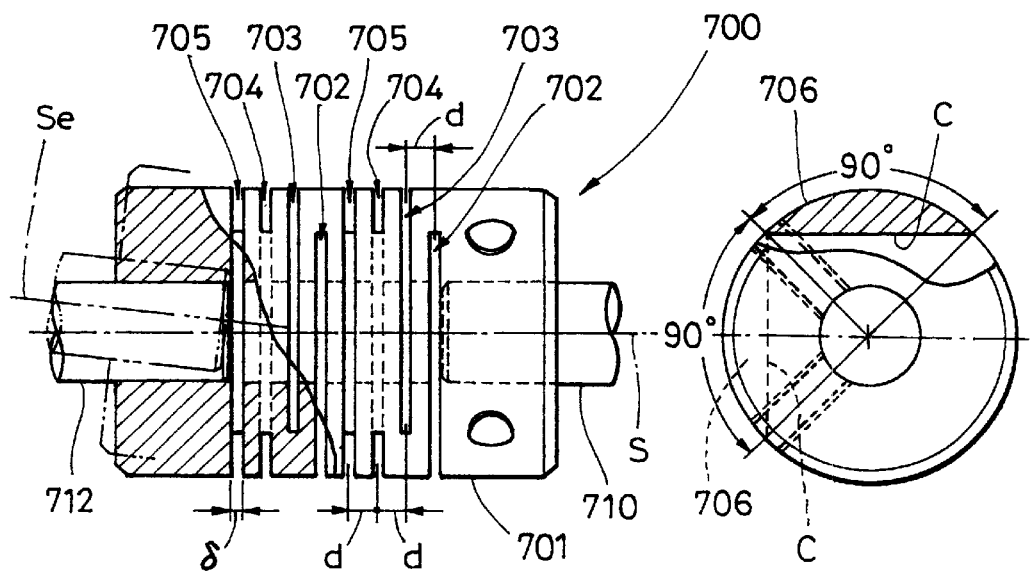
FIG. 7(a) is a side view showing a prior art universal joint, viewed in a direction perpendicular to the axis line.
FIG. 7(b) is a side view thereof, viewed along the axis line.

FIG. 6(a) is a side view of a linking boss portion 411 in the fifth embodiment and FIG. 6(b) is a cross-sectional view thereof along a line B—B in FIG. 6(a). A slit 413 having a base plane 412 perpendicular to the axis line L2 is formed in the linking boss portion 411 so that it debouches at a small distance S2 from one surface 411a of the linking boss portion 411 on the side, where the bending plate 23 is mounted, towards the surface 411b opposite thereto and traverses the linking boss portion 411 along a diameter.

Bolt holes 417 are formed in a direction perpendicular to the slit 413 on each of the sides of the linking boss portion 411, putting the shaft hole 415 therebetween. That is, a bolt throughhole 418 is formed in one of the wall surface portions opposite to each other of the slit 413, around which a hollow 421 is disposed for sinking a head of a bolt, while a female screw 422 is formed on the other thereof.

Bolts (not shown) are inserted in bolt throughholes and fastened in a direction for reducing the width of the slit 413. In this way linkage of the linking boss portion 411 with the dynamic force transmitting shaft 410 is achieved by fixing a surface 423 of the dynamic force transmitting shaft engaged with the shaft hole 415 with a small play to the inner peripheral surface 424 thereof by press.

Although several preferred embodiments of the present invention have been explained, referring to the drawings, the embodiments do not restrict the present invention. It is a matter of course that it is possible to combine various constructions and embodiments within an extent defined by the claims.

As clearly seen from the above explanation, by using the universal joint according to the present invention, since arbors for caulking are formed protrudingly on each of the linking boss portions and intermediate disk themselves by die cast formation, it is possible to reduce the size necessary for fixing the bending plates to the limit without damaging strength and to deal with down-sizing for outer diameters smaller than 20 mm and durability while maintaining a satisfactory precision. In addition, by mass-production by die cast and mechanization of caulking work it is easy to realize cost reduction.

What is claimed is:

1. A universal joint comprising:
   a pair of thin bending plates;
   a pair of linking boss portions, each of which supports one of said thin bending plates at two points in the neighborhood of two extremities of a diameter on one-side surface thereof; and
   an intermediate disk supporting said thin bending plates similarly at two points on each surface in the neighborhood of two extremities of a straight line orthogonal to the diameter;
   wherein said linking boss portions and said intermediate disk are made of a high duty aluminum alloy for elongation having a high tenacity by die cast and an arbor for caulking protruding from the center of each of supports holding said thin bending plates, which secures directly one of said bending plates, is formed in one body therewith by die casting, the improvement wherein said protruding arbor for caulking is constructed in one body by insert formation using another suitable member at the die cast formation of each of said linking boss portions and said intermediate disk.

2. A universal joint comprising:

a pair of thin bending plates;

a pair of linking boss portions, each said linking boss portion including a pair of linking boss supports protruding axially from spaced locations on one side of said linking boss portion and each linking boss portion including corresponding pairs of linking boss arbors projecting axially and outwardly from the center of said linking boss supports, said linking boss supports and said linking boss arbors being monolithic with said linking boss portion, and wherein each pair of said linking boss arbors supports one of said thin bending plates at two points equidistant from a central axis of said respective linking boss portions on the respective side thereof; and an intermediate disk including a pair of disk supports on opposing sides of said disk protruding axially from spaced locations thereof and disk arbors for caulking projecting axially and outwardly from the center of respective said disk supports, said disk supports and said disk arbors being monolithic with said intermediate disk, and wherein each pair of said disk arbors on the respective sides of said intermediate disk supports one of said thin bending plates at two points equidistant from a central axis of said intermediate disk, wherein said bending plates are secured between respective opposing sides of said intermediate disk and said linking boss portions by said respective linking boss arbors and corresponding said disk arbors.

3. The universal joint of claim 2, wherein said disk supports and said disk arbors of said intermediate disk are formed monolithic by die casting.

* * * * *